United States Patent [19]

Struziak

[11] Patent Number: 5,540,505
[45] Date of Patent: Jul. 30, 1996

[54] TOP FOIL PLATE FOR HYDRODYNAMIC FLUID FILM THRUST BEARINGS

[75] Inventor: Ronald M. Struziak, Longmeadow, Mass.

[73] Assignee: United Technologies Corporation, Hartford, Conn.

[21] Appl. No.: 424,027

[22] Filed: Apr. 18, 1998

[51] Int. Cl.$^6$ .................................................. F16C 32/06
[52] U.S. Cl. ................................................................ 384/105
[58] Field of Search .................................. 384/105, 106, 384/103

[56] References Cited

U.S. PATENT DOCUMENTS

| | | | |
|---|---|---|---|
| 4,208,076 | 6/1980 | Gray et al. | 384/105 |
| 4,462,700 | 7/1984 | Agrawal | 384/105 |
| 4,624,583 | 11/1986 | Saville et al. | 384/105 |

FOREIGN PATENT DOCUMENTS 74910  4/1986  Japan ..................................... 384/103

*Primary Examiner*—Thomas R. Hannon
*Attorney, Agent, or Firm*—Norman Friedland

[57] ABSTRACT

The top foil of a hydrodynamic fluid film thrust bearing is formed from a single flat annular disk with radial depressions extending from the outer diameter to the inner diameter of the disk that protrude toward the foil plate and define between adjacent depressions a working surface that is configured to complement the foil bumpers attached to the foil plate. The bump foils of the upper foil plate and the bump foils of the lower foil plates can be either in axial alignment or can be displaced relative to each other. When the two sets of bump foils are displaced, the leading edge of the upper bump foils are disposed upstream (relative to the direction of the air stream entering the bump foils) of the leading edge of the lower bump foils.

8 Claims, 2 Drawing Sheets

TOP FOIL PLATE FOR HYDRODYNAMIC FLUID FILM THRUST BEARINGS

CROSS REFERENCE

The subject matter of this patent application relates to U.S. patent application (Attorney's Docket No. N413) filed by myself on event date and entitled "Hydrodynamic Air Thrust Bearing with Offset Bump Foils" and commonly assigned to United Technologies Corporation.

TECHNICAL FIELD

This invention relates to hydrodynamic fluid film thrust bearings and particularly to the construction of the top foil plate.

BACKGROUND ART

This invention constitutes an improvement over U.S. Pat. No. 4,462,700 granted to G. L. Agrawal on Jul. 31, 1984 entitled "Hydrodynamic Fluid Film Thrust Bearing" and commonly assigned to United Technologies Corporation. As is well known in this technology, the thrust bearing consists of a plurality of the top foil plate segments and a plurality of segmented bump foils configured in wedge shape or pads. The top foil plate segments fit over the segmented bump foils and each of the segments are attached to the upper face of the foil plate. Hence, the number of top foil plate segments is identical to the number of the bump foil segments. The leading edge of the segments, i.e. the top foil plates and the bump foils, are individually welded to the foil plate and are uniformly spaced around the circumference of the foil plate. The trailing edge is unattached and left free to move axially. The foil plate is a toroidally shaped disk or washer like member and the inner diameter fits over the rotating shaft of the rotating machinery. The thrust bearing is sandwiched between the thrust runner and the thrust plate.

In this heretofore known thrust bearing design, each of the segments are welded to the foil plate and hence in a design that utilizes 7 pads of the bump foils and 7 pads of the top foil there are 14 leading edges that are welded to the foil plate. This number of welds inherently produces an undesirable warpage to the thrust bearing which adversely affects the load carrying capacity of the bearing. Additionally, it is customary to coat the top surface of each of the top foil pads with a dry film lubricated coating to reduce friction during the rotating machine start-up and coastdown, inasmuch as this surface comes into contact with the thrust runner since the rotational speed is not sufficient to maintain an air film. Since each top foil pad is coated it has been found that the thickness and texture of the coating on each of the pads tends to vary and is not uniform.

I have found that I can improve these types of hydrodynamic foil bearings by fabricating the top foil into a single piece that is relatively flat disk shaped similarly to the foil plate and is stamped into wedge shaped arcuate segments by a radial depression to define the top foils. The disk fits over the bump foils that are welded to the foil plate and the top foils stamped into the disk overlie the bump foils. The flat disk, which is a one piece configuration, eliminates the welding requirement and the entire top surface is coated, thus eliminating the necessity of coating individual pads. This results in a more uniform thickness and texture of the dry lubricant coating.

SUMMARY OF THE INVENTION

An object of this invention is to provide an improved hydrodynamic air foil thrust bearing.

A feature of this invention is to provide a top foil plate that is formed from a single sheet metal stock configured in a washer-like shaped disc having the foil pads complementing the bump foils stamped therein thereby eliminating the necessity of welding individual pads to the top foil plate and providing a single surface to be coated with a dry lubricant and minimizing or eliminating non-uniform thickness and texture of the coating.

The foregoing and other features of the present invention will become more apparent from the following description and accompanying drawings.

DETAILED DESCRIPTION OF THE PREFERRED EMBODIMENT

While this invention discloses different embodiments for practicing this invention, it is to be understood that as one skilled in this art will appreciate the invention has application for other types of hydrodynamic fluid thrust bearings particularly where it is desirable to eliminate the necessity of fabricating the top foil into separate pads.

Figure 1:
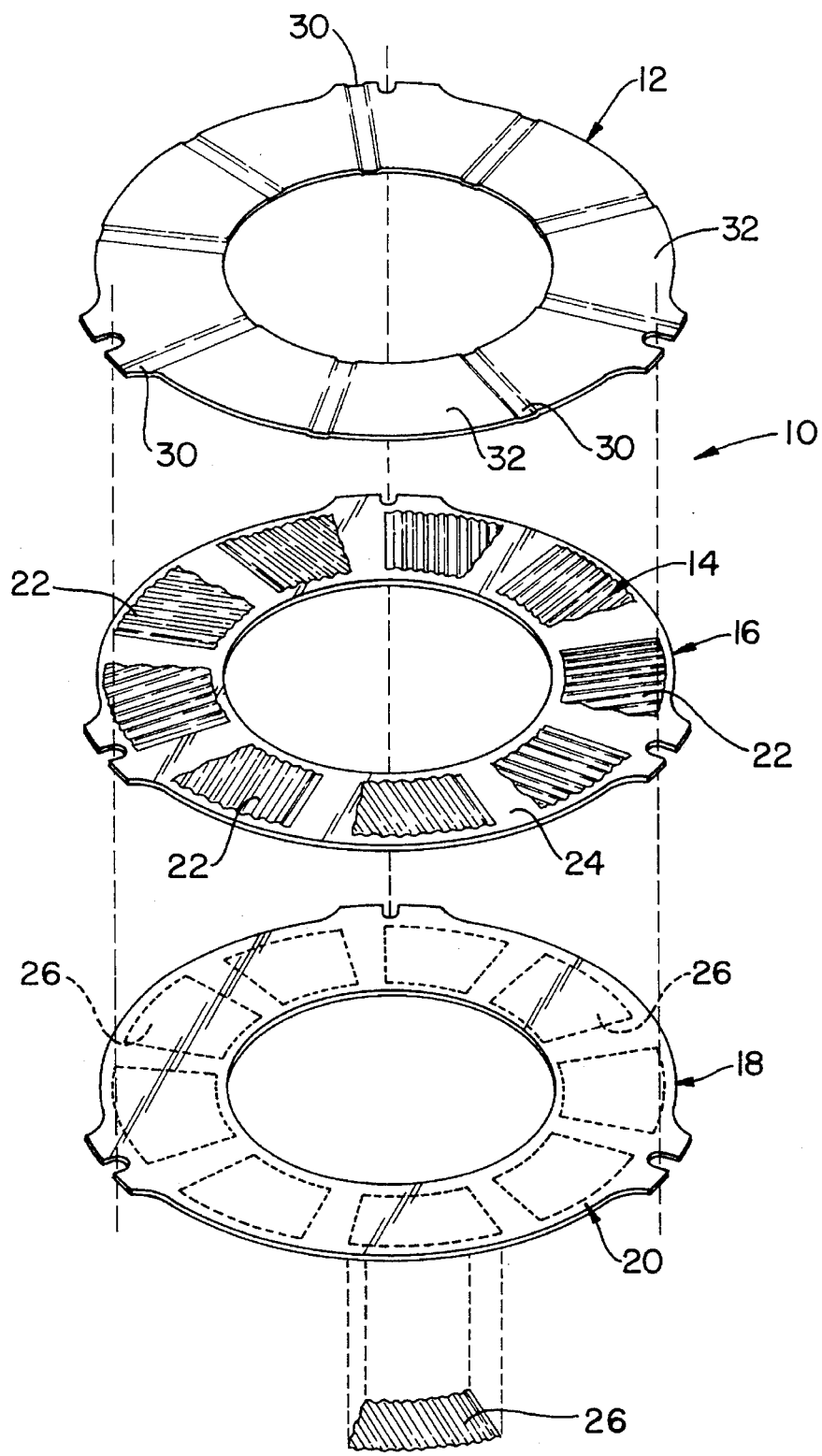
FIG. 1 is an exploded view in perspective illustrating the details of this invention employed in a hydrodynamic fluid film thrust bearing.
Figure 3:
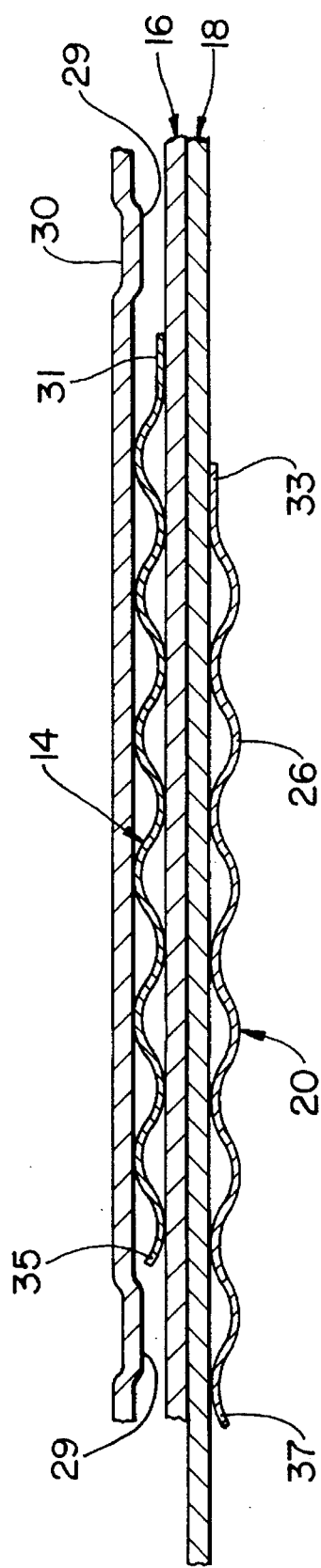
FIG. 3 is a view identical as that disclosed in FIG. 2 with the bump foils being offset.
Figure 2:
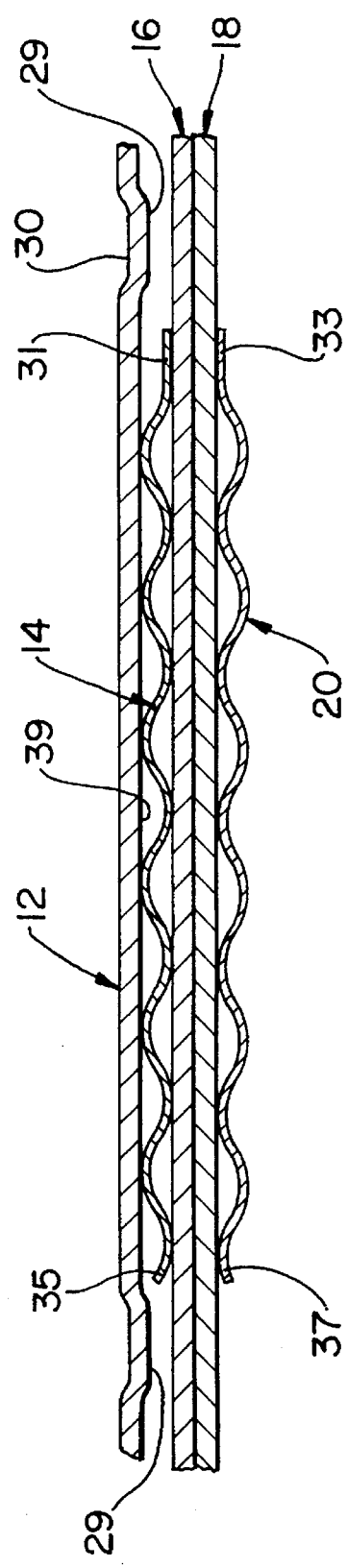
FIG. 2 is a sectional view taken through the radial plane of the thrust bearing depicted in FIG. 1.

The invention is best understood by referring to FIGS. 1–3 which disclose the thrust bearing generally indicated by reference numeral 10 comprising a top foil plate 12, bump foils 14, foil plate 16, foil plate 18 and bump foils 20. As seen in FIG. 1 which is an exploded view in perspective, the nine (9) bump foils 14 consists of corrugated wedge shaped or truncated sector shaped pads 22 with the corrugations oriented radially spaced circumferentially around the flat outer face 24 of foil plate 16.

The backing spring consisting of the lower foil plate 18 which also has attached thereto nine (9) bump foils formed into corrugated wedge shaped pads 26 with the corrugations oriented similarly to the orientation of the pads 22. Wedge shaped pads 26 are circumferentitially spaced around the under flat surface 28 of foil plate 18.

The wedge shaped bump foils 14 and 20 which are made from a spring metallic material that is highly resilient provide compliancy to the thrust bearing which is required for proper air film formation. They also serve as springs so that a certain minimum preload may always be maintained by the thrust bearings when shimmed on opposite sides of a thrust runner to fix the runner's axial position within the rotary machine, such as an air cycle machine, on which it is being used. The spring rate of the wedge shaped pads and foil plates are predicated on the particular parameters of the application for which they are intended for use. Likewise, as one skilled in this art will appreciate, the number of bump foils will likewise be predicated on the particular application. Attachment of the bump foils to the upper and lower foil plates is by any suitable means. As is well known, either the leading edge or trailing edge is welded, brazed or suitably joined to the foil plate and the opposite end, i.e. the leading or trailing edge, is left unattached so as to freely move in the axial direction. This aspect of the invention is well known and for further details thereof reference should be made to U.S. Pat. No. 4,462,700, supra.

In accordance with this invention, the top foil plate 12, is formed from a single flat toroidally shaped spring metallic material that is stamped to form radial depressions 30 with the apex 29 oriented downwardly facing the flat surface 24 of foil plate 16. The adjacent depressions 30 define therebetween a plurality of wedge or sector shaped elevated portions 32 equalling in number and being substantially configured to the size and shape of each of the bump foils 22 so as to define a working surface 39 to complement and cooperate therewith when in running operation. As noted in FIGS. 1–3, the sector portions overlie the bump foils 14 and serve the same purpose as the heretofore known individual top foils. An example of the heretofore known top foils are described in U.S. Pat. No. 4,462,700, supra.

Since the top foil 12 is fabricated from a single piece it obviates the heretofore known problems incidental to coating the heretofore known individual top foils as described hereinabove. The upper surface of the top foil plate is coated with a well known dry film low friction lubricating material that serves to reduce friction during the start-up and coastdown of the rotating portion of the rotary machine. This is particularly important since this coating is in contact with the thrust runner whose rotational speed during start-up and coastdown is insufficient to maintain an air film.

The configuration of the thrust bearing in FIG. 2 disposes the leading edge 31 and 33 and the trailing edge 35 and 37, of each of the bump foils 14 and 26, respectively to overlie each other. The configuration of the thrust bearing depicted in FIG. 3 is such that the leading edges 31 and 33 and the trailing edges 35 and 37 of the bump foils 14 and 20, respectively are displaced relative to each other as shown. (Like elements depicted in all the FIGS. reference the same reference numerals)

This invention affords a number of advantages over the heretofore known hydrodynamic fluid film thrust bearing, including, without limitations:

1) The fabrication of the top foil is simplified since it is made from a single piece;
2) The number of parts are reduced and hence inventory is likewise reduced;
3) The top foil is not welded to the foil plate which facilitates the assembly and manufacturing thereof; (Heretofore, the top foils and bump foils were both welded to the foil plate, and this compound welding sometimes resulted in warpage of the thrust bearing, which reduces load carrying capacity thereof); and
4) Because the top foil coating is applied in one operation over the entire surface of the top foil rather than to the separate top foil pieces of the heretofore known thrust bearings, the thickness of the coating and its texture is more uniform.

Although this invention has been shown and described with respect to detailed embodiments thereof, it will be appreciated and understood by those skilled in the art that various changes in form and detail thereof may be made without departing from the spirit and scope of the claimed invention.

I claim:

1. A hydrodynamic fluid film thrust bearing having a foil plate formed from a single piece configured into an annular torroidally shaped member having a flat upper surface, a plurality of upper bump foils having opposing side edges circumferentially spaced on said upper flat surface, means for attaching one of said opposing side edges to said flat upper surface and permitting the other one of said opposing side edges to move circumferentially, a top foil configured into a flat washer shaped member overlying said Upper foil plate having circumferentially spaced radial depressions projecting toward said upper foil plate and extending from the inner diameter of said washer member to the outer diameter of said washer member, said top foil having a lower surface parallel to the upper foil plate and an upper surface, said depressions defining a plurality of flat surface portions therebetween, each of said flat surface portions between adjacent depressions on said lower surface being configured to overlie and complement each of the upper bump foils, wherein the top surface of said top foil may be deflected by hydrodynamic pressure to form a sloped surface and being coated with a dry low friction lubricant in a single application.

2. A hydrodynamic fluid film thrust bearing as claimed in claim 1 including am annular flat lower foil plate having an under flat surface identically configured as said upper foil plate, a plurality of lower bump foils having opposing side edges identical in number to said upper bump foils being circumferentially spaced on said under flat surface, means for attaching one of each of said opposing side edges to said under flat surface and allowing the other of said opposing side edges to move circumferentially, said upper bump foils and said lower bump foils being in axial alignment.

3. A hydrodynamic fluid film thrust bearing as claimed in claim 2 wherein the opposing side edges of said upper bump foils and said lower bump foils include a leading edge and a trailing edge relative to the flow of fluid entering said thrust bearing, said leading edge of said upper bump foil being attached to said flat upper surface of said upper foil plate and said trailing edge being free to move circumferentially.

4. A hydrodynamic fluid film thrust bearing as claimed in claim 2 wherein the opposing side edges of said upper bump foils and said lower bump foils include a leading edge and a trailing edge relative to the flow of fluid entering said thrust bearing, said trailing edge of said lower foil being attached to said flat lower surface of said lower foil plate and said leading edge being free to move circumferentially.

5. A hydrodynamic fluid film thrust bearing as claimed in claim 1 including an annular flat lower foil plate having an under flat surface identically configured as said Upper foil plate, a plurality of lower bump foils having opposing side edges identical in number to said upper bump foils being circumferentially spaced on said under flat surface, means for attaching one of each of said opposing side edges to said under flat surface and allowing the other of said opposing side edges to move circumferentially, said upper bump foils and said lower bump foils being offset relative to each other.

6. A hydrodynamic fluid film thrust bearing as claimed in claim 5 wherein the opposing side edges of said upper bump foils and said lower bump foils include a leading edge and a trailing edge relative to the flow of fluid entering said thrust bearing, said leading edge of said upper foil being attached to said flat upper surface of said foil plate and said trailing edge being free to move circumferentially.

7. A hydrodynamic fluid film thrust bearing as claimed in claim 5 wherein the opposing side edges of said upper bump foils and said lower bump foils include a leading edge and a trailing edge relative to the flow of fluid entering said thrust bearing, said trailing edge of said lower bump foils being attached to said flat lower surface of said lower foil plate and said leading edge being free to move circumferentially.

8. A hydrodynamic thrust bearing as claimed in claim 5 wherein the opposing side edges of said upper bump foils and said lower bump foils include a leading edge and a trailing edge relative to the flow of fluid entering said thrust bearing, said leading edge of the upper bump foil being attached to said upper foil plate and said trailing edge of the upper bump foil being free to move circumferentially and said leading edge of the lower bump foil being attached to said lower foil plate and said trailing edge of said lower bump foil being free to move circumferentially.

\* \* \* \* \*